United States Patent
Green

[15] 3,666,103
[45] May 30, 1972

[54] WASTE DISPOSAL SYSTEM FOR A HUMAN CONVEYANCE

[72] Inventor: Harry W. Green, Ann Arbor, Mich.
[73] Assignee: The Standard Products Company, Cleveland, Ohio
[22] Filed: May 5, 1971
[21] Appl. No.: 140,492

[52] U.S. Cl............................................210/152, 4/8, 4/10, 4/114, 4/115, 210/14, 210/197, 210/241
[51] Int. Cl...........................................................C02c 1/02
[58] Field of Search...................210/14, 15, 197, 152, 241; 261/DIG. 4; 4/8, 10, 114, 115

[56] References Cited
UNITED STATES PATENTS

| 1,996,325 | 4/1935 | Cox | 4/114 X |
| 1,765,338 | 6/1930 | Jones et al. | 210/197 |
| 2,587,197 | 2/1952 | Mousel | 261/DIG. 4 |

*Primary Examiner*—Michael Rogers
*Attorney*—Meyer, Tilberry & Body

[57] ABSTRACT

A waste disposal system for a human conveyance includes a waste tank for receiving liquid and organic waste material. An aerating device for aerating waste material in the tank is operated by air pressure during movement of the conveyance to bubble air through waste material in the tank.

3 Claims, 3 Drawing Figures

PATENTED MAY 30 1972 3,666,103

INVENTOR.
HARRY W. GREEN
BY
Meyer, Tilberry & Body
ATTORNEYS

WASTE DISPOSAL SYSTEM FOR A HUMAN CONVEYANCE

BACKGROUND OF THE INVENTION

This application pertains to the art of waste disposal and more particularly to aeration of waste material. The invention is particularly applicable to use with a human conveyance and will be described with particular reference thereto although it will be appreciated that certain aspects of the invention may be used in fixed installations.

Waste disposal systems of a known type include a waste tank for receiving liquid and organic waste material. The waste material is fed to a heated vaporizer where it is vaporized and burned. In a system of this type, it is desirable that good septic action take place in the waste material contained in the waste tank in order to convert organic solids to liquids. With such an arrangement, substantially only liquid is fed to the vaporizer and solids do not rapidly buildup within the tank. One known system of this type is described in U.S. Pat. Re. No. 26,891 issued May 26, 1970.

Septic action may occur within the waste tank due to either aerobic or anaerobic bacterial action. In a properly operating septic tank, a scum forms on the surface of the waste material and blocks the waste material against exposure to air. Under such conditions, anaerobic bacteria thrive and efficiently convert organic solids to liquids. However, systems of the type described are often installed on a human conveyance which causes sloshing of the waste material in the tank during movement. Such sloshing during movement of the conveyance breaks the scum on the surface of the waste material and exposes the surface of the waste material to air. Anaerobic bacteria cannot survive under such conditions and do not act effectively to convert organic solids to liquids. At the same time, the amount of exposure to air is not sufficient to promote efficient aerobic bacterial action.

It is possible to provide an air pump for bubbling air through the waste material in the waste tank for promoting efficient aerobic bacterial action. The use of an air pump is expensive and requires periodic maintainance. It would be desirable to aerate the waste material to promote efficient aerobic bacterial action without the need of an electrically driven air pump.

SUMMARY OF THE INVENTION

A waste disposal system of the type described is installed on a human conveyance having an air scoop thereon. The air scoop is connected with the waste tank through a conduit. Movement of the conveyance results in delivery of air from the air scoop to the tank through the conduit. This arrangement efficiently supplies sufficient air to promote good aerobic bacterial action. Bubbling air through the waste material only during movement of the vehicle insures against the supply of too much air which might oxidize the aerobic bacteria themselves.

In accordance with one arrangement, a housing is positioned within the waste tank and an air conduit is connected with the bottom portion of the housing. Supply of air to the interior of the housing operates in the manner of an air pump so that waste material flows upward through the housing. A passageway in the bottom portion of the housing communicates with the waste tank so that waste material circulates from the waste tank upwardly through the housing to thoroughly aerate all of the waste material.

It is a principal object of the present invention to provide an improved arrangement for aerating waste material in a waste tank.

It is another object of the present invention to provide an aerating arrangement which insures aeration of all of the waste material in a waste tank.

It is an additional object of the present invention to utilize movement of a human conveyance to provide air pressure for aerating waste material in a waste tank.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Figure 1:
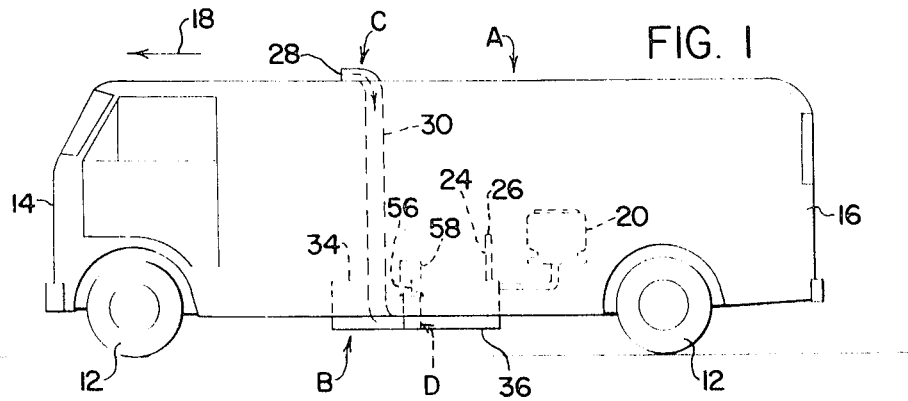
FIG. 1 is a side elevational view of a human conveyance having the improvements of the present invention incorporated therein.
Figure 2:
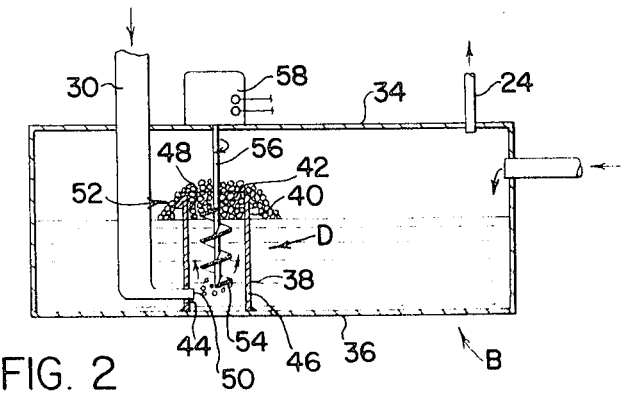
FIG. 2 is a cross-sectional elevational view of a septic tank having the present invention incorporated therein.
Figure 3:
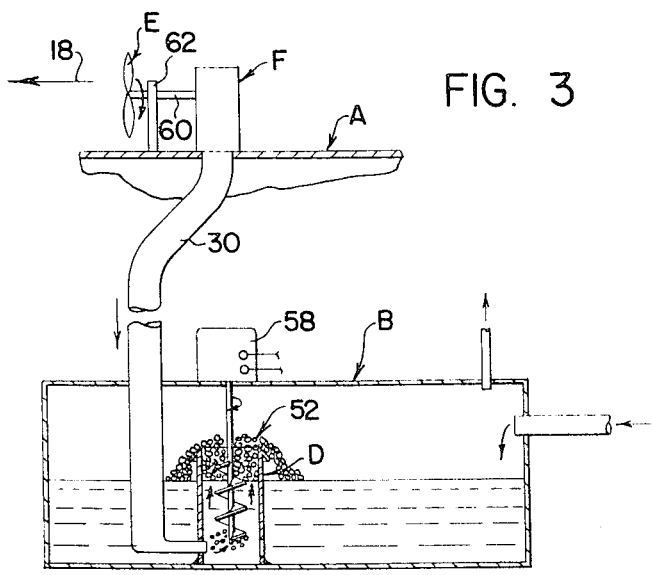
FIG. 3 is a cross-sectional elevational view of a septic tank having another form of the present invention incorporated therein.

Referring now to the drawings, wherein the showings are for purposes of illustrating a preferred embodiment of the invention only and not for purposes of limiting same, FIG. 1 shows a human conveyance A in the form of a motor home or camping vehicle. It will be recognized that the present invention may be used with any form of human conveyance, such as buses, boats or airplanes. Certain aspects of the invention are also capable of use in fixed installations. Conveyance A has wheels 12, at least two of which are rotatably driven by a suitable fuel burning engine, for moving conveyance A. Conveyance A has a front portion 14 and a rear portion 16, and normally travels in the direction of arrow 18.

Installed on conveyance A is a toilet 20 which discharges through conduit 22 to waste tank B. It will be recognized that other sanitary facilities, such as a shower, lavatory and sink may also be installed on conveyance A and discharge into waste tank B. Waste tank B has an upwardly extending vent conduit 24 connected to the upper portion thereof and is open to atmosphere at upper end 26.

In accordance with the invention, conveyance A has a large air scoop C installed thereon. Air scoop C has a large opening 28 facing toward front portion 14 of conveyance A. Air scoop C tapers inwardly toward rear portion 16 of conveyance A and is connected with a conduit 30 which communicates with the interior of waste tank B.

In accordance with one arrangement, waste tank B includes a top wall 34 and a bottom wall 36. A housing D is installed within waste tank B as by welding the bottom portion D thereof to bottom wall 36 of tank B. Housing D has an upper end portion 40 which is located adjacent top wall 34 of tank B. Housing D has an upper opening 42 and a lower opening 44. Bottom portion 38 of housing D also has a passageway 46 therethrough which establishes communication between the interior of tank B and hollow interior 48 of housing D. Conduit 30 extends through top wall 34 of tank B and extends through opening 44 so that outlet end 50 thereof communicates with hollow interior 48 of housing D.

Waste tank B is normally less than 1 foot deep. The pressure beneath a 1 foot level of waste material is only around 0.433 psi gauge. During rapid movement of conveyance A in the direction of arrow 18, air enters opening 28 of scoop C and is forced through conduit 30. The air exits through outlet opening 50 of conduit 30 within hollow interior 48 of housing D adjacent bottom portion 38 thereof. This air bubbles upwardly through hollow interior 48 of housing B and greatly increases the volume of waste material within housing D due to expansion by the air bubbles. The waste material then foams upwardly and overflows top opening 42 as generally indicated by numeral 52. The circulation of waste material and air bubbles upwardly through housing D causes waste material in tank B to flow through passageway 46 into hollow interior 48 of housing D so that waste material is constantly circulated and effectively aerated. It will be recognized that bottom portion 38 may be spaced upwardly from bottom wall 36 and outlet opening 50 of conduit 30 can face upwardly at such an open bottom end. Passageway 46 would then be defined by a radial space between conduit 30 and the wall of housing D.

In accordance with one arrangement, an impeller 54 may be positioned within hollow interior 48 of housing D on a rotatable shaft 56 which is rotatably driven by an electric motor 58. When conveyance A is not moving, as when a boat is parked at dock or a motor home is parked at a camp sight, motor 58 may be energized to circulate waste material and provide some aeration thereof. Impeller 54 is shaped in such a manner that rotation of shaft 56 will throw waste material upwardly in housing D to flow out of opening 42. The vigorous mixing action provided by impeller 54, along with the circulation of waste material through passageway 46 and upwardly within housing D will serve to provide sufficient aeration of the waste material when the conveyance is not moving. Air within waste tank B due to the presence of air vent conduit 24 will provide aeration during the vigorous mixing action and upward flow of waste materials through housing D.

In accordance with another arrangement, an impeller or windmill E may be rotatably mounted on conveyance A. Windmill E is connected with a shaft 60 rotatably mounted in bearing 62. A positive displacement air pump is connected with shaft 60. Movement of conveyance A in the direction of arrow 18 causes windmill E and shaft 60 to rotate for driving pump F. Pump F has its outlet connected through conduit 30 to the interior of waste tank B in the same manner as previously described.

It will be recognized that a turbine impeller may also be used so that air scoop C has its outlet directed tangentially against a turbine impeller for driving an agitator or impeller which is positioned in housing D. That is, an air driven turbine impeller may replace electric motor 58 and be used for circulation and aeration of waste material when conveyance A is moving.

While the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A waste disposal system for a human conveyance including a waste tank for receiving liquid and organic waste material, aerating means for aerating waste material in said tank, said aerating means being operated by air pressure during movement of said conveyance to bubble air through waste material in said tank, said aerating means including air scoop means for receiving air during movement of said conveyance, conduit means connected with said tank and having an outlet positioned beneath waste material in said tank, said scoop means being connected with said conduit means, said tank having a bottom wall and a top wall and further including a housing having top and bottom portions, said bottom portion of said housing being positioned adjacent said bottom wall, said top portion of said housing being open and spaced downwardly from said top wall, said housing having an opening in said bottom portion thereof, said outlet of said conduit means being positioned in said opening, said housing having a passageway in said bottom portion thereof for circulating waste material from said tank upwardly through said housing when air is forced through said conduit means.

2. The device of claim 1 and further including rotatably driven impeller means positioned in said housing for drawing waste material from said waste tank through said passageway.

3. A waste disposal system for a human conveyance including a waste tank for receiving liquid and organic waste material, aerating means for aerating waste material in said tank, said aerating means being operated by air pressure during movement of said conveyance to bubble air through waste material in said tank during movement of said conveyance, said aerating means including air pump means and rotatable impeller means connected with said air pump means for operating said air pump means during rotation of said impeller means by air pressure when said conveyance is moving.

* * * * *